(No Model.)
D. C. VOSS.
ELECTRIC MOTOR CAR.
No. 423,400. Patented Mar. 11, 1890.
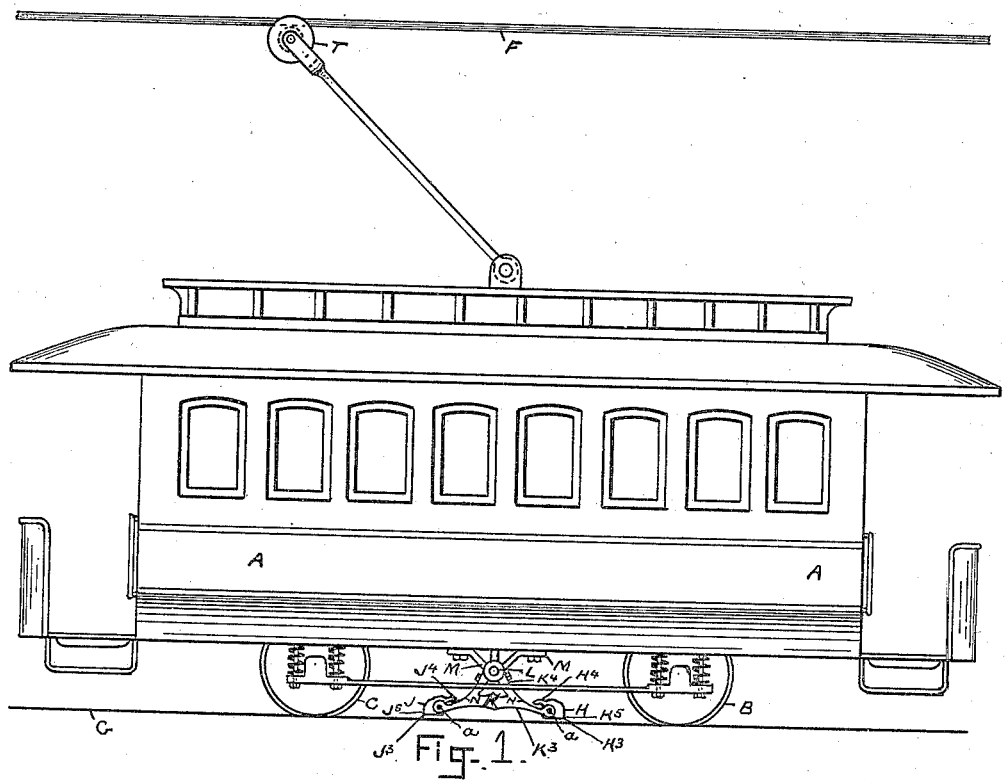
Fig. 1.
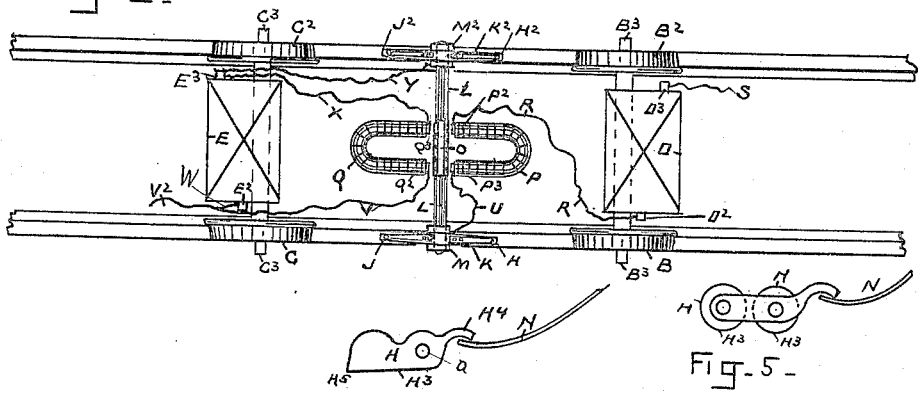
Fig. 2.
Fig. 3.
Fig. 5.
WITNESSES:
Edward A. Clark.
Albert W. Brown.
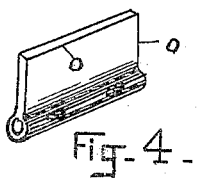
Fig. 4.
INVENTOR:
Detlef C. Voss.

UNITED STATES PATENT OFFICE.

DETLEF C. VOSS, OF MEDFORD, ASSIGNOR OF ONE-HALF TO EDWARD A. CLARK, OF BOSTON, MASSACHUSETTS.

ELECTRIC-MOTOR CAR.

SPECIFICATION forming part of Letters Patent No. 423,400, dated March 11, 1890.

Application filed December 4, 1889. Serial No. 332,552. (No model.)

*To all whom it may concern:*

Be it known that I, DETLEF C. VOSS, a citizen of the United States of America, and a resident of the town of Medford, in the county of Middlesex and State of Massachusetts, have invented certain new and useful Improvements in Electric-Motor Cars, of which the following is a full, clear, and exact description.

In electric-motor cars using a rail or rails of the railway and a wheel or wheels of the car as parts of an electric circuit completed through a motor of the car and an overhead or an underground wire, as the case may be, all as well known, it is obvious that the electric contact of wheel and rail is rolling and practically tangential, and at its best represented by a line across the tread and parallel with the axis of the wheel, and as a whole resulting in frequent breaks of electric contact, waste of electric energy and power, and wear and deterioration of working parts. Manifestly it is desirable to avoid these disadvantages; and to that end this invention, in substance, consists in the combination, with an electric-motor car otherwise of suitable electric construction and connection, of a trolley or other appliance which is distinct and separate from the wheels of the car and is held and located on the car for electric contact with a rail in the electric circuit of the motor, and is shaped to secure electric contact of an appreciable length relative to the length of the rail as compared with the electric contact of a wheel of the car with the rail, and of an electric connection placing said trolley or other appliance for electric contact with the rail in the electric circuit of the electric motor of the car.

Furthermore, this invention, in substance, consists in the combination, with a car which has a separate electric motor for each set of its wheels and otherwise has an electric construction and connection for the use, as may be desired, of the motor at either end of the car and all as well known, of a trolley or trolleys or other appliances which are distinct and separate from the wheels of and are held on the car at opposite points of its length relative to the length of and severally adapted for electric contact with the rail, (preferably an electric contact of an appreciable length relative to the length of the rail as compared with the electric contact of a wheel of the car with the rail,) a support which at its opposite end portions carries said electric contact appliances and is held on the car and is otherwise suitably adapted to be operated to place said electric contact appliances at either of its end portions into and out of contact with the rail, an armature held on and moving with said support or carrier for said electric contacts, electro-magnets held on the car and located on each side of said armature, and an electric connection between the electro magnet or magnets at one side of the armature with the electric motor of the car at the same side, all substantially as hereinafter described.

In addition to the above the invention consists of a trolley or other appliance for electric contact with a rail, all as has been described, and held on a suitable support of the car and otherwise adapted and arranged to slide on the rail, in combination with means which are applied to it and its support, and are otherwise suitably arranged to yield as to, and yet practically and always, maintain its contact with the rail.

In the drawings forming part of this specification, Figure 1 is a side elevation of a street-railway car to be run by electric motors using an overhead wire and showing electric contacts with the rails embracing the several features of this invention, as before described. Fig. 2 is a plan view with the body of the car removed. Figs. 3, 4, and 5 are views in detail, as will hereinafter appear.

In the drawings, A represents the body of a street-railway car. B B$^2$ and C C$^2$ are its wheels at opposite end portions. B$^3$ and C$^3$ are the axles common to each set of wheels, and D E are electric motors shown in blank and held on the car at its opposite end portions. Each motor is in electric connection with an overhead wire F and through the car-wheels with the rails G G of a railway, and otherwise all is as well-known and therefore needs no particular description, except as is necessary for the explanation of the parts directly constituting this invention.

H H² and J J² are trolleys, particularly shown (except in Fig. 5) as shoes, each made of copper or other suitable electric-conducting material. The several trolleys are for electric contact with the rails G G. There is a pair of trolleys for each contact and in a corresponding line with the rail, and the several trolleys are located between the wheels and at each side of the car. The trolleys of each pair are hung on separate pivots $a$, that are held on common triangular-shaped frames K K², each of proper construction otherwise, and both held on a common transverse shaft L, located under the car-body A, and at its opposite end portions suspended and hung in hangers or brackets M M², fixed to the under side of and pendent from the body of the car. There is a rail-trolley contact at each end of the lower horizontal side K³ of each triangular frame-support or carrier K K², running just above the tread of the rails. Each rail-trolley contact projects lengthwise forward and rearward, as the case may be, of its pivot-joint $a$ on its carrier and also below it, presenting faces H³ J³ in each for contact with the rail belonging to it, and again each rail-trolley contact at its heel end H⁴ J⁴ is of hook shape, receiving on its under side the free end of an upward-acting spring-band N, secured at its other end to the carrier K or K², as the case may be, and at or near its upper portion K⁴. Each spring-band works on the heel of the rail-trolley contact, to which it is applied to press its toe end H⁵ J⁵ downward toward the rail, and so with the trolley in contact with its rail elastic yielding contact is secured, all as will hereinafter appear.

O is an armature held on and extending vertically upward from the middle portion of the shaft L toward the under side of the car-body. This armature O and shaft L, carrying it, as described, swing as one.

P Q are two electro-magnets of any suitable construction and both placed under and held in any suitable manner on the body of the car and in the same horizontal plane with the poles of the one toward those of the other, but on opposite sides of the armature, which in its normal position stands between them.

As shown, Fig. 2, R is a wire connecting one pole P² of the electro-magnet P with the opposite pole D² of the electric motor D at the corresponding side, and this motor D, at its other pole D³, is connected by a wire S with the trolley T of the car-body, running in electric contact with the overhead wire F. The pole P³ of the electro-magnet P, opposite to that connected, as stated, to pole D² of the electric motor D, is connected by a wire U to the support or carrier K for the rail-trolley contacts H H² at one end of the shaft L, common to carriers K K², the whole securing electric connection through the electric motor D and electro-magnet P, the rail-trolley contacts H H² J J², the overhead wire F, and the rails G G, assuming, of course, and as is the case, that both rails are electrically connected, as well known, and that the shaft L, common to the carriers K K², for the rail-trolley contacts and said carriers are electric conductors; and thereby, with the electric motor D suitably adjusted, as well known, is secured an electric circuit through said electro-magnet and a consequent attraction of the armature O toward and against it, and a rocking of the shaft L, and carriers on which the armature is held in a direction to place the rail-trolley contacts H J, which are carried by the supports K K² and are toward said motor, into contact with the rails, and the electric circuit is closed. The electric circuit continues closed so long as said electric motor is maintained in electric connection, as described, and is broken or opened by breaking the electric connection of motor on which, as is obvious, the electric action of the electro-magnet P ceases, releasing the armature O and breaking the contact of said rail-trolley contacts H J and rails G G.

In the electric connection of electric motor D, electro-magnet P, and rail-trolley contacts H J, as just described, it is obvious that the electric current actuating the motor first passes through the motor, and thence to and through the rail-trolley contacts H J, and to and through the rails G G, and otherwise, all as well known. In this electric connection, if desired, the electric current may also pass to the rails through the car-wheels B B² if in suitable connection therefor with the electric motor D, all as well known.

Again, as shown, Fig. 2, V is a wire connecting pole Q² of the electro-magnet $q$ with the opposite pole E² of the electric motor E at the corresponding side of the armature, and W is a wire connecting motor E at its pole E² by wire V² with the trolley T of the car-body in electric contact with the overhead wire F. The pole Q³ of electro-magnet Q opposite to the pole Q², connected, as described, with the overhead wire F, is connected by a wire X with the pole E³ of the electric motor E, and this pole E³ of the electric motor is connected by a wire Y to the carrier K² for the rail-trolley contacts H² J², and which is at the opposite end of the shaft L to that of the carrier K, connected, as explained, to a pole P² of the electro-magnet P. This electric connection of electro-magnet Q with the electric connections of electric motor E in co-operation and through the rails G G secures, when the electric motor E is properly adjusted therefor, electric action of electro-magnet Q and armature O, and thereby the swing of the rail-trolley contacts H² J² on the corresponding side of the electro-magnet Q into contact with the rails G G, closing the electric circuit, and so on, as before, and all in conjunction, if so desired, with electric connection through the car-wheels C C² and their axles C³ and rails.

The electric connection of electro-magnet

Q, just explained, is a shunt-connection, as well known, and as to this invention it is advantageous only in that it divides the electric current, causing the current to pass in multiple through the motor and magnet and thence uniting, passing as a whole through the rail-trolley contacts.

Either electric connection of the electro-magnets described may be used with either or both magnets, and it is to be distinctly understood that the invention is not to be limited to either one, and again that neither connection of itself forms any part of this invention, they being both well known as forms of electric connection in combination with other electric mechanisms.

From the explanation given it is plain that the electric contact of the rail-trolley contacts with the rails is automatic in every respect and secured, in either instance described, directly from the action of the electric motor, according as either one or the other motor is put into electric operation.

As is plain, the contact of the rail-trolley contacts with the rails G G is a sliding contact in contradistinction to a rolling and tangential contact, as heretofore in electric-motor cars and which was also only through the wheels of the car, and this electric contact is appreciatively greater than that heretofore obtained though the wheels of the car, and consequently the liability of breaks in electric contact of car and rails is reduced to the minimum, correspondingly reducing the waste of electric energy and power and wear and deterioration of working parts.

The number of rail-trolley contacts in the form or in the modified form hereinafter explained or in any other suitable form may, as is obvious, be more or less as to either direction relative to the length of and as to either or both rails. Again, each rail-trolley contact may have a separate carrier with a separate armature and electro-magnet and electric connection therefor, such as explained.

Although it is preferable to hang the rail-trolley contacts and to have them exert a yielding elastic pressure, as explained obviously, they may themselves be rigid or unyielding, and the carriers may be made yielding, or they and their carriers may both be adapted either for rigid or for yielding contact.

It is preferable that there should be for the operation of either electric motor a rail-trolley contact or contacts for both rails; but plainly there may be such contacts for only one rail, and in this case either may be selected, provided, of course, that it is otherwise in suitable electric connection.

If rail-trolley contacts are used for both rails, then it is desirable that one of the carriers therefor should be adapted for closer contact thereof with the rail than the other, for the reason that thereby electric contact with one of the rails at least will be always insured.

The rail-trolley contacts on each side of the car and co-operating together may have separate electro-magnets suitably electrically connected and otherwise, all as described for them.

The electric connection between the overhead wire and the rail or rails may be solely through the rail-trolley contacts, or both through them and the wheels.

The rail-trolley contacts, one or more, may be in wholes, as explained, or in separate parts electrically connected, and in lieu of sliding contacts, obviously, a small wheel or rolling contact may be used, and in one or more parts—as for illustration, Fig. 5, wherein one form of rolling contacts in two parts is illustrated.

The invention described is as applicable to underground as to overhead wire connection with the car, which is the form particularly shown, and the invention is neither to be limited in this relation nor to the kind of electric motor or motors, nor whether one or more electric motors are used, nor to the material which is used for, nor to the form of, the electric connections described.

Having thus described my invention, what I claim, and desire to secure by Letters Patent, is—

1. The combination, with an electric-motor car and a railway therefor, both in the same electric circuit, of appliances which are held on and are distinct and separate from the wheels of the car and are adapted to be placed in and out of contact with and in contact to travel along the railway, and of an electrically-operated device in circuit between said contact appliances and the motor of the car to close and to open the electric circuit of said appliances, substantially as described, for the purpose specified.

2. The combination, with an electric-motor car and a railway therefor, both in the same electric circuit, of appliances which are held on and are distinct and separate from the wheels of the car and are adapted to be placed in and out of contact with and in contact to travel along the railway, and of an electrically-operated device in circuit between said contact appliances and the motor of the car to close and open the electric current of said appliances, consisting, essentially, of an electro-magnet and an armature therefor, both held on the car, and of electric conductors connecting the coils of the magnet and motor and said contact appliances, substantially as described, for the purpose specified.

3. The combination, with an electric-motor car having electric motors at opposite ends, each arranged for separate action, and a railway in the electric circuit of the car, of appliances which are held on and are distinct and separate from the wheels of the car and are located at opposite points relatively to the length of the car, and either and both of which are adapted to be separately placed in and out of contact with and in contact to travel along the railway, and of an electrically-operated device in circuit between the contact appliances and the motors to close and open the electric current of said contact appliances, consisting, essentially, of electric magnets P Q, having their poles presented toward each other but without contact, an armature O, located between said magnets and all held on the car, and electric conductors connecting said contact appliances and the coils of one magnet and the electric motor at the same end of the car, and the coils of the other magnet and the electric motor at the same end of the car, substantially as described, for the purposes specified.

4. The combination, with an electric-motor car and a railway therefor, both in the same electric circuit, of appliances which are held on and are distinct and separate from the wheels of the car and are adapted to be moved and thus to be placed in and out of contact with and in contact to travel along the railway, and of an electrically-operated device in circuit between said contact appliances and the motor of the car to close and open the electric current of said appliances, consisting, essentially, of an electro-magnet held on the car, an armature carried by and moving in unison with said contact appliances, and electric conductors connecting said contact appliances, the coils of the magnet and motor, substantially as described, for the purpose specified.

5. The combination, with an electric-motor car and a railway therefor, both in the same electric circuit, of appliances which are held on and are distinct and separate from the wheels of the car and are adapted to be placed in and out of contact with the railway and in contact to travel slidingly along the railway, and of an electrically-operated device in circuit between said appliances and the motor of the car to close and open the electric circuit of said appliances, substantially as described, for the purpose specified.

In testimony whereof I have hereunto set my hand in the presence of two subscribing witnesses.

DETLEF C. VOSS.

Witnesses:
EDWARD A. CLARK,
ALBERT W. BROWN.